United States Patent [19]

Baader

[11] Patent Number: 4,498,855

[45] Date of Patent: Feb. 12, 1985

[54] APPARATUS FOR THE TREATMENT OF ANIMAL EXCREMENTS AND SEWAGE SLUDGES

[76] Inventor: Wolfgang Baader, Bundesallee 50, 3300 Braunschweig, Fed. Rep. of Germany

[21] Appl. No.: 555,510

[22] Filed: Nov. 28, 1983

Related U.S. Application Data

[60] Division of Ser. No. 533,152, Sep. 16, 1983, , which is a continuation of Ser. No. 346,608, Feb. 8, 1982, abandoned, which is a continuation of Ser. No. 875,088, Feb. 3, 1978, abandoned.

[30] Foreign Application Priority Data

Feb. 8, 1977 [DE] Fed. Rep. of Germany ........ 2705098

[51] Int. Cl.³ .......................... B29C 23/00; B29F 3/04
[52] U.S. Cl. .................................... 425/308; 264/141; 425/376 R; 425/461
[58] Field of Search ............... 425/309, 308, 461, 463, 425/464, 376 B, 467, 192 R; 264/241, 242

[56] References Cited

U.S. PATENT DOCUMENTS

| | | | |
|---|---|---|---|
| 2,908,037 | 10/1959 | Harkenrider | 425/192 |
| 3,025,564 | 3/1962 | Voigt | 264/142 |
| 3,380,129 | 4/1968 | Magruder | 425/309 |
| 3,561,051 | 2/1971 | Reinhart et al. | 425/192 |
| 4,082,532 | 4/1978 | Imhof | 71/8 |
| 4,151,241 | 4/1979 | Bradbury et al. | 264/141 |

FOREIGN PATENT DOCUMENTS

| | | | |
|---|---|---|---|
| 0145868 | 12/1978 | Japan | 264/142 |
| 0148510 | 11/1981 | Japan | 264/142 |

Primary Examiner—Willard E. Hoag
Attorney, Agent, or Firm—Salter & Michaelson

[57] ABSTRACT

Apparatus for the treatment of animal excrement material, particularly liquid manure and sewage sludges, in which the material containing a high percentage of liquid is mixed with a dry additive, preferably the re-circulated dry material, and after forming into briquettes which can be heaped is ripened in heaps penetrable by air, in which for the ripening process briquettes are employed having a volume predominantly between 30 and 50 cm³. The briquettes are conveniently formed in a worm press to have a diameter of between 30 and 40 mm. and a length of between 40 and 80 mm. For a larger diameter briquette, provision is made to form a hole in the briquette. The method is performed by using an extrusion press having a moulding die having at least two sections separated by a slit there being, in each case, hole sections extending outward from the slit and opposite to each other, said sections forming the die channel, the inputs to the slits and to the hole sections having an input angle less than 45° to the axis of the hole.

9 Claims, 4 Drawing Figures

APPARATUS FOR THE TREATMENT OF ANIMAL EXCREMENTS AND SEWAGE SLUDGES

This is a divisional application of continuation application Ser. No. 06/533,152 filed Sept. 16, 1983, which is a continuation of application Ser. No. 06/346,608 filed Feb. 8, 1982 (abandoned), which is a continuation of application Ser. No. 05/875,088 filed Feb. 3, 1978 (abandoned).

The invention concerns a method for the treatment of material such as animal excrements, in particular liquid manure and sewage sludges as well as similar highly concentrated organic slurries, in which material containing a high percentage of liquid is mixed with dry additives, preferably the recirculated dry material, and after forming into briquettes capable of being heaped, the briquettes are ripened in heaps permeable by air.

Attempts to carry out such a process by the method known from DT-OS No. 21 62 161 showed that it is difficult to achieve a self-maintaining process of ripening by this method. A change was therefore made to carrying out ripening in a crumbly mixture containing a volume of air distributed uniformly in fine pores. A satisfactory ripening process is possible by this method in heat insulated reactors, where at filling heights necessary for economic operation it is necessary to provide for forced aeration—DT-OS No. 23 16 476—Grundl, Landtechnik Vol. 25, 1975, No. 2, pages 33 to 64.

The conversion of animal excrements and sewage sludges into odourless solid materials which are easily handled and which constitute a valuable organic fertiliser is a desirable aim from the point of view of environmental protection. It can however only be achieved if it can be attained with acceptable cost. However this is not yet possible by known methods. It is thus an object of the invention to devise a method which can be carried out at low cost.

In the course of work directed towards the solving of this problem it was unexpectedly observed that with a method of the type described in the introduction to this specification it is possible to acheve a ripening process which will maintain itself with high reliability by using for the ripening process briquettes with a volume predominantly between 30 and 50 cu$^3$.

The briquettes are preferably produced by pressing in a worm press to have a diameter of between 30 and 40 mm and a length of between 40 and 80 mm. With briquettes of larger diameter it has been found convenient to mould the briquettes with an axial hole in each briquette.

A particular problem in the manufacture of briquettes in worm presses is that the materials to be treated are often mixed with fibrous material, as animal excrements generally contain a percentage of hair or of feathers according to origin. Such fibrous material usually leads to the blocking of ordinary dies after a short time.

This problem is solved according to a feature of the invention, by means of a moulding die having at least two die sections separated by a slit, in which there are provided hole segments extending outwards from the slit and opposite to each other, where the input apertures of the slit and of the segments of the hole are designed with an input angle less than 45° to the axis of the hole.

The input apertures are preferably designed to be curved where the tangent to the curve at the entry to the input aperture makes an angle less than 45° with the axis of the hole. The die core preferably consists of a plurality of discs.

For the manufacture of briquettes with holes there is preferably mounted on one section of the die, a plate-shaped mounting for a core of rod form, the rear of which is designed in the input direction with an input angle less than 45° to the axis of the hole. The core is preferably mounted to swivel on the mounting.

For subdivision of the extrusion leaving the die there is preferably provided a rotating dividing finger at a distance in front of the outlet from the die. The dividing finger is preferably fixed to a bush which can be rotated on a fixed axle situated centrally with respect to the die. The driving means conveniently comprises a sprocket wheel fixed on the bush at a distance behind the dividing finger, a separating disc to protect the spocket wheel against direct soiling being provided between the dividing finger and the sprocket wheel.

The method according to the invention is described in detail in the following and is illustrated with respect to the new type of moulding device in the accompanying drawings, in which.

Figure 1:
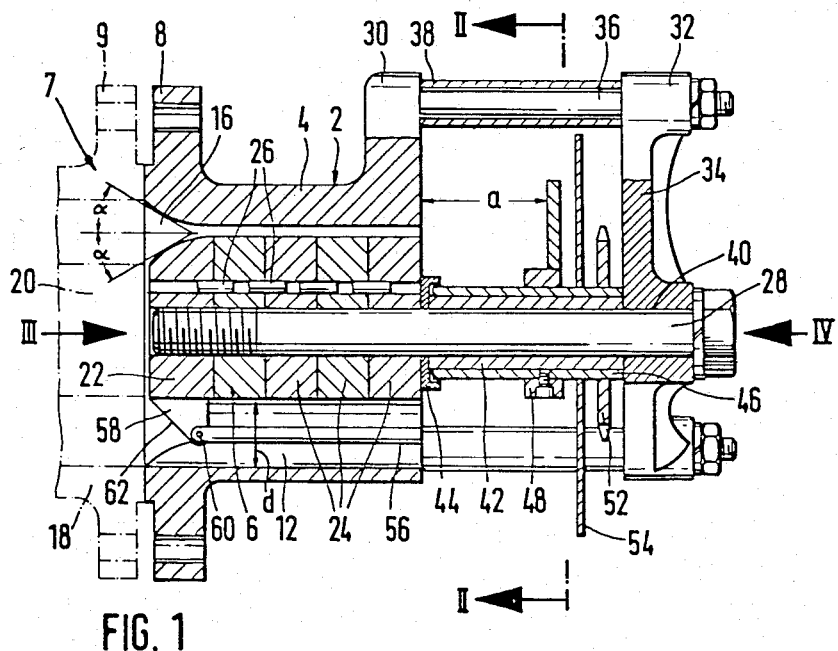
FIG. 1 is a longitudinal section through a moulding die according to the invention.
Figure 2:
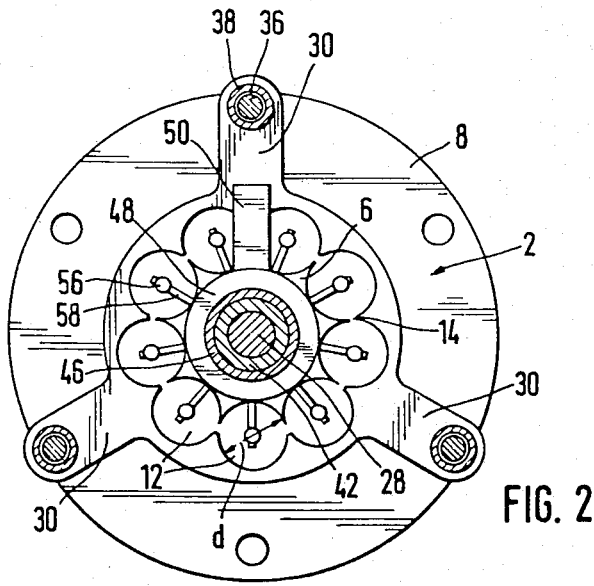
FIG. 2 is a section on the line II—II in FIG. 1.
Figure 3:
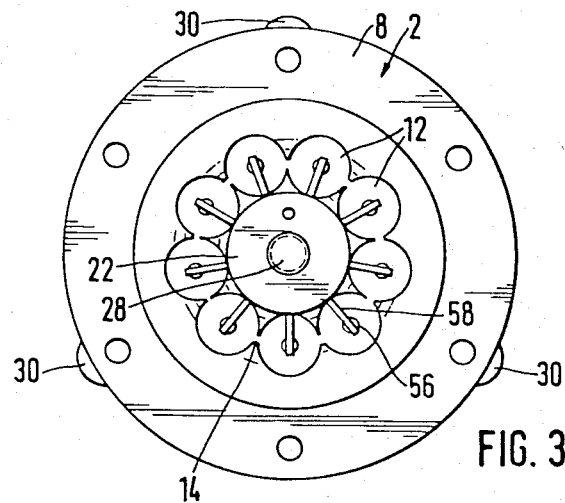
FIG. 3 is an end view in the direction of the arrow III in FIG. 1.
Figure 4:
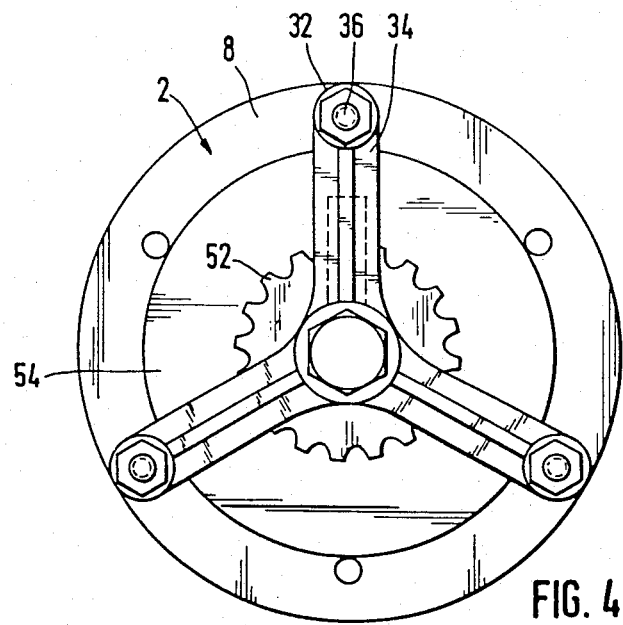
FIG. 4 is an end view in the direction of arrow IV in FIG. 1.

The starting material for the method to be described is animal excrement, in particular liquid manure or sewage sludge, which contains a high percentage of liquid. The starting material is mixed in a known manner with a carbon-containing material. One particular example of the carbon-containing material is re-circulated dried material which forms the end product of the method. By the addition of the carbon-containing material and/or the partial de-watering of the starting material and/or the completed mixture of the starting material and the carbon-containing material, the water content of the mixture is adjusted to, at maximum, 60%. Subsequently, briquettes having a volume of predominantly more than 30 cm$^3$, preferably predominantly from 30 to 50 cm$^3$ are formed from the mixture which has been produced in this way. The briquettes are preferably pressed in a worm press and have a diameter of 30 to 40 mm and a length of 40 to 80 mm. In the upper range of diameter, the briquettes are preferably formed with an axial hole. The briquettes are subsequently ripened in loose heaps.

In experiments with briquettes which were fabricated using liquid chicken manure as the starting material and recirculated dried material as the additive, the briquettes were placed in loose heaps in a reactor to a filling height of 5 m. It was found that in this case, the ripening process commenced practically spontaneously. Even a few hours after filling the reactor, the briquettes had started to generate heat. The presence of oxygen necessary for ripening can be ensured by the natural suction of the reactor during ripening. It was even found necessary to throttle the air supply through the air inlet provided in the base of the reactor. It is thus possible in the method according to the invention, to dispense with artificial aeration of any kind or an additional supply of oxygen and to establish optimal conditions for the ripening process by controlling the natural suction.

For a ripening process eliminating smell almost completely and with practically complete killing of germs, a throughput time of 3 days, with the temperature held at about 65° C. during 2 days, and this could be reached without difficulty, was found to be sufficient.

In addition, very good results were obtained by depositing the briquettes in loose heaps on an airing grid. Once again, the ripening process commenced after only a very short time of storage and led to the desired ripening of the heap.

It is, in addition, possible to place the briquettes in a container provided with a seive base in which ripening takes place. Such containers have a base in the form of a sieve through which the air necessary for ripening enters. In this case the containers provided for ripening can also be used as the transport containers.

By the method according to the invention, it is possible to construct the mechanical plant required for carrying out the method according to the invention in a very compact form. When re-cycled dried material is used as the additive, a hammer mill to pulverise the dried material, a mixer to mix the dry material with the starting material and a worm press for the fabrication of the briquettes are provided.

As the material to be worked frequently contains fibrous components, for example hair or feathers, blockages quickly arise with nozzles with holes such as are usually employed with worm presses and these quickly lead to incomplete formation of the briquettes, blockages of the die and overloading of the worm press. This problem is eliminated by means of a die provided by the invention and as is illustrated in the accompanying drawings.

The die 2 illustrated in the drawing comprises a die housing 4 and a die core 6. The die housing 4 is provided with an attachment flange 8 by means of which it can be attached to a flange 9 at the output end of a warm press 7. The die 2 has a plurality of die channels 12 concentric with the longitudinal axis of the die and situated immediately next to each other and are connected together by slits 14, one wall of said channel being formed by the housing 4 and the other by the core 6. Thus the die channels 12 are, in each case, formed as recesses in the internal wall of the die housing 4 and in the external circumference of the die core 6. The input channels 16 to the die channels are, in each case, funnel shaped, preferably with an inlet angle less than 45° measured from the axis of the die channel. The inlets are preferably designed to be curved where the tangent to the curve at the beginning of the inlet makes an angle less than 45° with the axis of the passage. The external diameter of the inlet funnel 16 is equal to the internal diameter of the housing 18 of the worm press, while the internal diameter of the inlet funnel 16 is equal to the external diameter of the worm shaft 20. The die core consists of a plurality of core discs 22, 24, of which the core disc 22 carries the inner contour of the inlet funnel 16, while the core discs 24 are designed to be similar. The core discs are secured against rotation by arresting pins 26. They are pressed together by means of a central screw 28 which is screwed into a thread in the core disc 22. The length of the die channel can be adjusted by changing the number of core discs 22. Core discs 22 having variable throughput cross-sections may also be used. In this way, the die can be adapted to the prevailing operating conditions and to the condition of the material.

In the embodiment illustrated by way of example, the die channels are shown with circular cross-section. It may be convenient to increase the throughput to enlarge the recesses in the external die housing by the inclusion of part of the wedge cross-section in the throughput cross-section.

At its output end, the die housing 4 has three flange fingers 30. A carrier flange 34 having three flange fingers 32 is provided at a distance in front of the output end of the die housing 4 and is connected to the flange fingers 30 of the housing 4 by means of screws 36 and distance collars 38. A bore 40 through which the screw 28 passes is provided centrally in the carrier flange 34. Between the carrier flange 34 and the die core 6, there is a distance bush 42 which is supported against the end ring of the die core by means of a disc 44. The die core is thereby braced against the carrier flange 34 through the bush 42 and the disc 44. The axial forces are transferred by means of the screws 36 to the die housing 4. On the carrier flange 34 there is a bush 46 mounted to rotate in bearings. A dividing finger 50 is fixed on the bush 46 by means of an attachment ring 48. The dividing finger 50 is situated in front of the outlet of the die channels 12 at a distance equal to the desired length of the briquettes. Close to the carrier flange 34 a coarsely-toothed sprocket wheel 52 is fixed on the bush 46. By means of the sprocket wheel 52 the bush 46 and with it the dividing finger 50 can be set in rotation by an externally situated chain drive. Between the dividing finger 50 and the sprocket wheel 52 a disc 54 is fixed on the bush 46. The disc 54 prevents direct soiling of the sprocket wheel by the briquettes. For the fabrication of the briquettes by the method according to the invention, the diameter d of the die channel 12 is about 30 to 40 mm. and the distance a between the outer front face of the die housing 4 and the dividing finger 50 is about 40 to 80 mm.

With a briquette of greater diameter it is desirable to increase the free surface by producing a hole in the briquette. For this purpose the die 2 can be provided with mandrels. Radially projecting plate-shaped mountings 58 for the mandrels are provided on the core disc 22, centrally with respect to the die channel 12. The mandrels 56 are preferably attached for swivelling on the mounting 58 by articulating pins 60. The rear face 62 of the mounting is once again bevelled in the direction of input.

Because of the slits 14 connecting the individual die channels 12 and the inlet funnel 16, as well as the bevelled rear face 62 of the mountings for the mandrels, where provided, it is possible for fibrous components of the material to be extruded to enter the die channels without hindrance and to pass through the die, even when the fibres extend through two or more neighbouring briquettes. During the cutting apart of the briquettes by the dividing finger 50, these fibres are, in most cases, pulled out of one of the briquettes. It is however unimportant, even for further working of the briquettes, if the briquettes remain joined together by fibres of this kind.

Thus it is possible by means of the die designed according to the invention to press material, even when it is relatively heavily mixed with fibres, in a continuous manner and without danger of blocking the die.

To protect the bearings of the bush 46, the ring 44 is preferably provided on its external circumference with an annular flange overlapping the end of the bush 46, as is shown in the drawing.

What I claim as my invention and desire to secure by Letters Patent of the United States is:

1. In an extrusion press for making briquettes of natural waste material including organic waste substance, the improvement comprising a die having two substantially concentric members defining an array of passages therebetween said passages being disposed about and substantially parallel to the axis of said concentric members, all pairs of adjacent said passages being connected by a slit therebetween and extending along said passage and at a distance from the outlet ends of said passages a dividing finger being disposed and rotatable about said axis.

2. An extrusion press according to claim 1, in which the die core is formed from a plurality of core discs.

3. In the extrusion press of claim 1, the inlets to the slits and to the passages having inlet angles less than 45° to the axes of the respective passages.

4. An extrusion press according to claim 1, in which the inlets are curved, and the tangent to the curve at the inlet of the die channel makes an angle less than 45° with the axis of the hole.

5. An extrusion press according to claim 4, in which the curved inlets are formed with their contours on the first core disc.

6. An extrusion press according to claim 1, in which plate-shaped mountings for cores in the form of rods are arranged on one of the die sections, the rear face of said mountings having an inlet angle in the direction of input smaller than 45° relative to the axis of the channel.

7. An extrusion press according to claim 6, in which the core is attached to swivel on the mounting.

8. An extrusion press according to claim 1 including a fixed shaft positioned coaxially to the axis of the concentric members of the die, a bush rotatable on said fixed shaft, said dividing finger carried by said bush.

9. An extrusion press according to claim 8, in which a sprocket wheel is provided on said bush at a distance behind said dividing finger and a separating disc is provided between said dividing finger and said sprocket wheel.

* * * * *